(12) United States Patent
Bain

(10) Patent No.: US 8,527,456 B2
(45) Date of Patent: *Sep. 3, 2013

(54) INTERPROCESS COMMUNICATION USING A SINGLE SEMAPHORE

(75) Inventor: Peter Douglas Bain, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/431,970

(22) Filed: Mar. 28, 2012

(65) Prior Publication Data

US 2012/0185875 A1    Jul. 19, 2012

Related U.S. Application Data

(63) Continuation of application No. 12/838,341, filed on Jul. 16, 2010, now Pat. No. 8,429,144.

(51) Int. Cl.
*G06F 7/00* (2006.01)
*G06F 17/30* (2006.01)

(52) U.S. Cl.
USPC .......................................... 707/610; 707/704

(58) Field of Classification Search
CPC ............... G06F 17/30575; G06F 17/30286; G06F 17/30067; G06F 17/30008; G06F 9/526; G06F 9/52; G06F 9/466
USPC ................ 707/704, 610, 611, 612, 613, 614
See application file for complete search history.

(56) References Cited

U.S. PATENT DOCUMENTS

| | | | | |
|---|---|---|---|---|
| 4,907,225 A | * | 3/1990 | Gulick et al. | 370/463 |
| 6,044,367 A | * | 3/2000 | Wolff | 707/704 |
| 6,237,019 B1 | * | 5/2001 | Ault et al. | 718/104 |
| 6,453,375 B1 | * | 9/2002 | Derr et al. | 710/200 |
| 7,089,555 B2 | * | 8/2006 | Calvignac et al. | 718/100 |
| 7,117,481 B1 | * | 10/2006 | Agesen et al. | 717/120 |
| 7,313,794 B1 | * | 12/2007 | Ansari | 718/102 |
| 2004/0221246 A1 | * | 11/2004 | Emerson et al. | 716/1 |
| 2006/0167916 A1 | * | 7/2006 | Vertes | 707/101 |

\* cited by examiner

*Primary Examiner* — Robert Beausoliel, Jr.
*Assistant Examiner* — Hexing Liu
(74) *Attorney, Agent, or Firm* — Nelson and Nelson; Daniel P. Nelson; Alexis V. Nelson

(57) ABSTRACT

A method to enable communication between software processes includes initiating a plurality of processes, the processes including both attachment processes and target processes. A single semaphore is created and initialized for use by the plurality of processes such that each of the target processes wait on the semaphore. An attachment process writes a message file, identifying a specific target process, to a location accessible by the target processes. The attachment process then increments the semaphore by the number of target processes, thereby unblocking the target processes and allowing them to check the message file. When the specific target process determines that the message file is intended for that target, a connection is established between the attachment process and the specific target process. The attachment process then decrements the semaphore to zero to block the target processes. A corresponding computer program product and apparatus are also disclosed herein.

8 Claims, 7 Drawing Sheets

INTERPROCESS COMMUNICATION USING A SINGLE SEMAPHORE

BACKGROUND

1. Field of the Invention

This invention relates to apparatus and methods for enabling software processes to communicate with one another.

2. Background of the Invention

Software processes are instances of computer programs executed on a processor. While executing, several processes often need to communicate with one another to pass data and/or instructions back and forth. For example, the J9 Java Virtual Machine developed by IBM includes an Attach API that enables several processes to communicate with one another for diagnostic and maintenance purposes. The Attach API enables a secondary attachment process of a first virtual machine (the "attacher" virtual machine) to communicate with a target process of the same or another virtual machine (the "target" virtual machine) while the target virtual machine is executing. This communication ideally occurs without interfering with the execution of the target virtual machine.

To enable the above-described communication, the attacher virtual machine needs a way to communicate with the target virtual machine in order to initiate the Attach API connection. Ideally, the method of communication would be portable among operating systems such as Linux®, Windows®, AIX®, and z/OS®, and have little if any run-time execution overhead. The method of communication will also ideally accommodate a large number of attacher and target virtual machines.

There are a number of conventional methods of communication that are provided by various operating systems. However, these methods of communication are typically not portable across different operating systems, place significant burdens on operating system resources, pose security risks, or generate unacceptable run-time overhead.

In view of the foregoing, what is needed is an apparatus and method to enable efficient communication between a large number of software processes. Ideally, such an apparatus and method will be portable across different operating systems, provide adequate security, not unduly burden operating system resources, and provide acceptable performance even with large numbers of processes.

SUMMARY

The invention has been developed in response to the present state of the art and, in particular, in response to the problems and needs in the art that have not yet been fully solved by currently available apparatus and methods. Accordingly, the invention has been developed to enable efficient communication between a large number of processes. The features and advantages of the invention will become more fully apparent from the following description and appended claims, or may be learned by practice of the invention as set forth hereinafter.

Consistent with the foregoing, a method to enable communication between software processes is disclosed herein. In one embodiment, such a method includes initiating a plurality of processes, the processes including both attachment processes and target processes. A single semaphore is created and initialized for use by the plurality of processes such that each of the target processes wait on the semaphore. An attachment process writes a message file, identifying a specific target process, to a location accessible by the target processes. The attachment process then increments the semaphore by the number of target processes, thereby unblocking the target processes and allowing them to check the message file. When the specific target process determines that the message file is intended for that target, a connection is established between the attachment process and the specific target process. The attachment process then decrements the semaphore to zero to block the target processes.

A corresponding computer program product and apparatus are also disclosed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
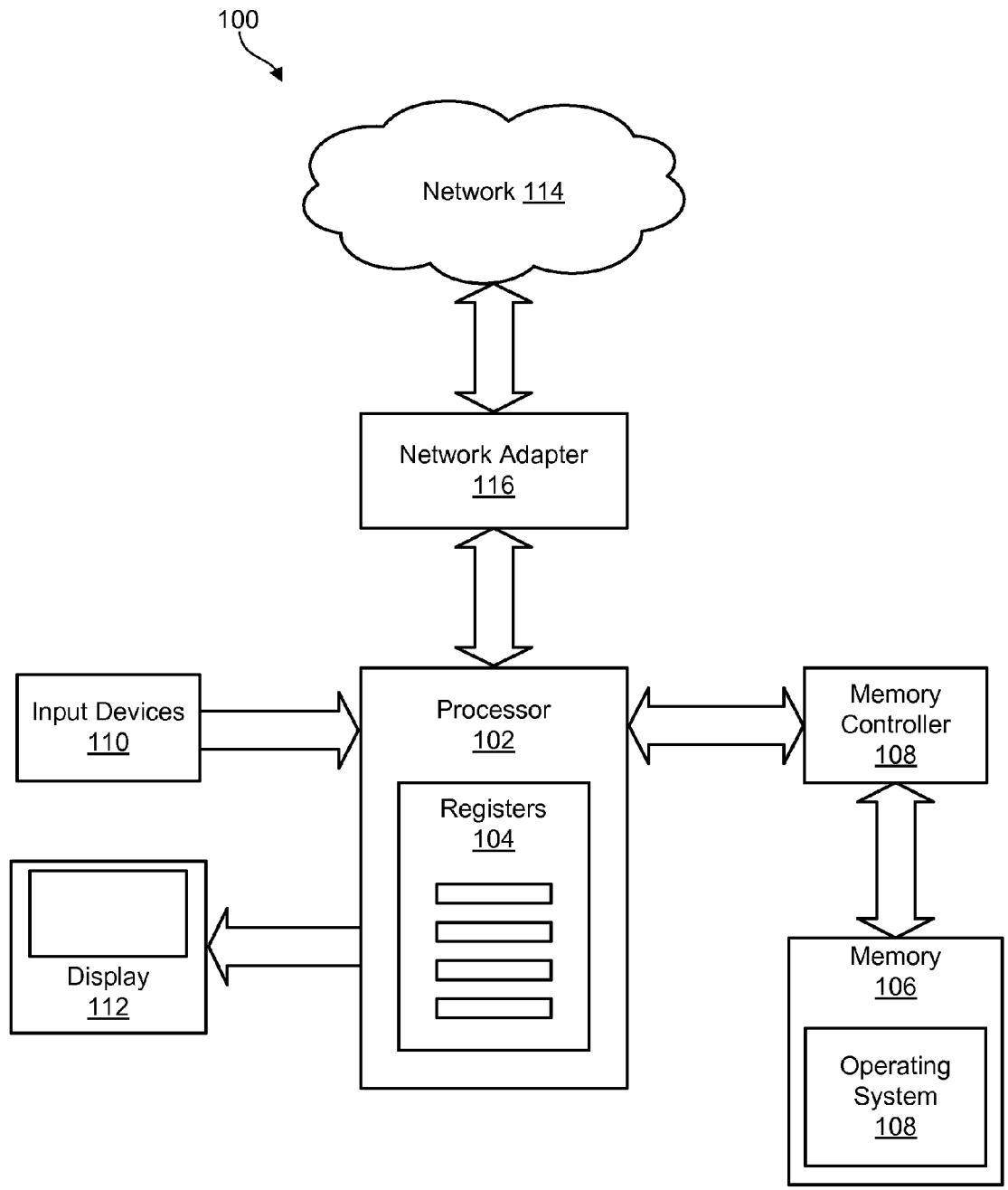
FIG. 1 is a high-level block diagram showing one example of a computer system suitable for use with an embodiment of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, may be implemented by computer program instructions or code. The computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a computer system 100 is illustrated. The computer system 100 is presented to show one example of an environment where an apparatus and method in accordance with the invention may be implemented. The computer system 100 is presented only by way of example and is not intended to be limiting. Indeed, the apparatus and methods disclosed herein may be applicable to a wide variety of different computer systems in addition to the computer system 100 shown. The apparatus and methods disclosed herein may also potentially be distributed across multiple computer systems 100.

The computer system 100 includes at least one processor 102 and may include more than one processor. The processor 102 includes one or more registers 104 storing data describing the state of the processor and facilitating execution of software systems. The registers 104 may be internal to the processor 102 or may be stored in a memory 106. The memory 106 stores operational and executable data that is operated upon by the processor 102. The memory 106 may be accessed by the processor 102 by means of a memory controller 108. The memory 106 may include volatile memory (e.g., RAM) as well as non-volatile memory (e.g., ROM, EPROM, EEPROM, hard disks, flash memory, etc.).

The processor 102 may be coupled to additional devices supporting execution of software and interaction with users. For example, the processor 102 may be coupled to one or more input devices 110, such as a mouse, keyboard, touch screen, microphone, or the like. The processor 102 may also be coupled to one or more output devices such as a display device 112, speaker, or the like. The processor 102 may communicate with one or more other computer systems by means of a network 114, such as a LAN, WAN, or the Internet. Communication over the network 114 may be facilitated by a network adapter 116.

Figure 2:
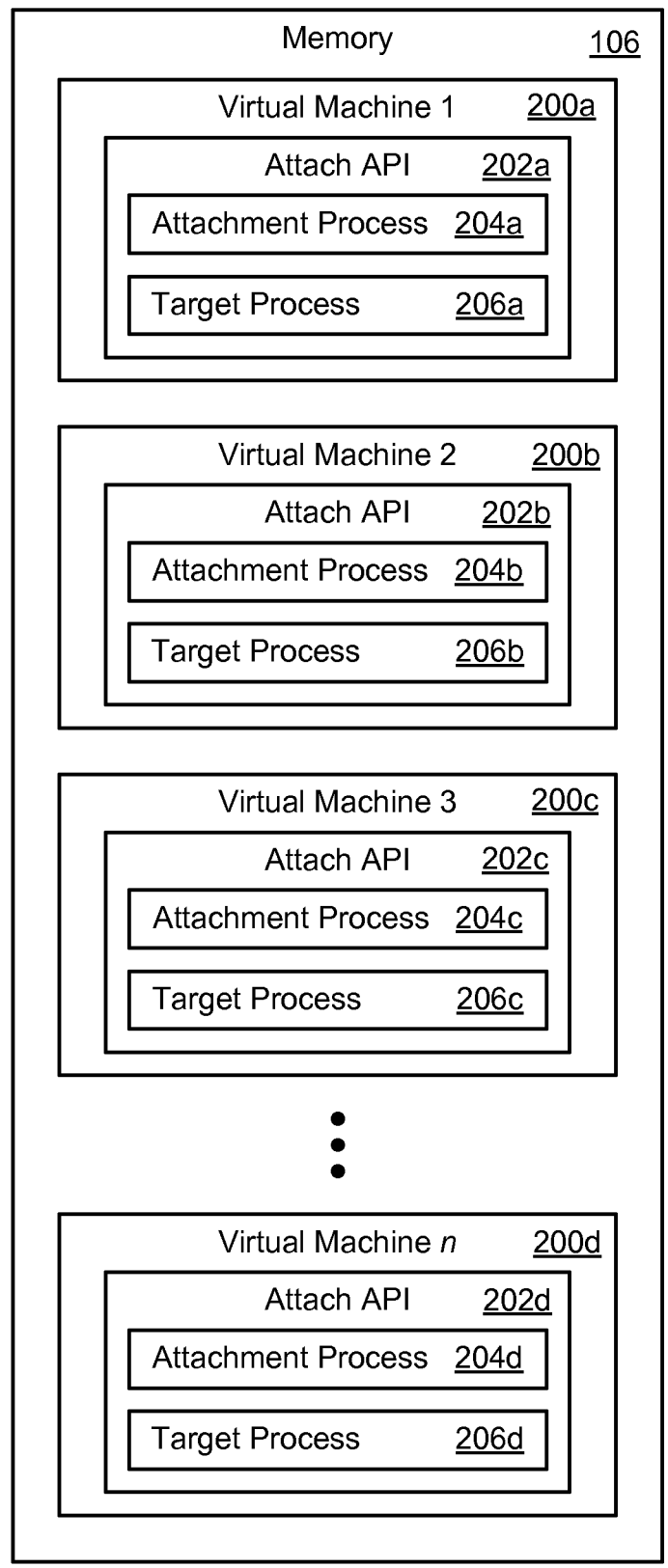
FIG. 2 is a high-level block diagram showing various virtual machines stored in the memory of the computer system.

Referring to FIG. 2, in selected embodiments, the memory 106 may store one or more virtual machines 200, each of which may execute one or more applications. In selected embodiments, the virtual machines 200 include APIs, such as the Attach API 202 previously discussed. The Attach API 202 may enable several processes to communicate with one another, such as for diagnostic and/or maintenance purposes. For example, the Attach API 202 may include an attachment process 204 that can attach to and exchange information with a target process 206 of the same or another virtual machine 200. Each of the attachment process 204 and target process 206 may include one or more threads. Ideally, the communication that occurs between an attachment process 204 and a target process 206 will not effect or will minimally effect the execution of the virtual machine 200 containing the target process 206.

Figure 3:
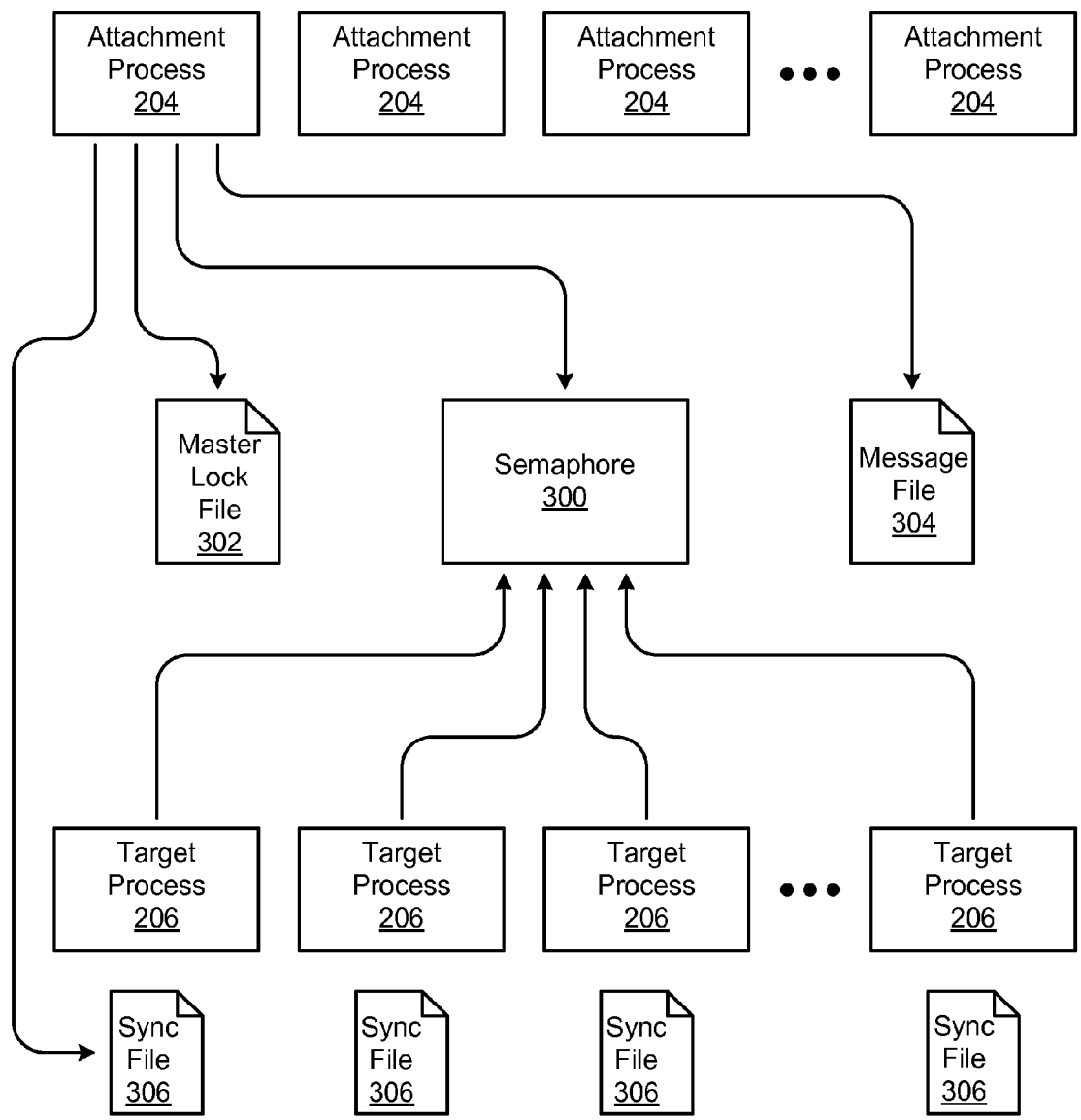
FIG. 3 is a high-level block diagram showing how a single semaphore may be used to enable communication between multiple processes.

Referring to FIG. 3, because a computer system 100 may host many virtual machines 200 (hundreds or even thousands in some embodiments), an attachment processes 204 can potentially communicate with a large number of target processes 206. A method is needed to allow the attachment process 204 to communicate with a specific target process 206 in a way that is portable across different operating systems, is secure, reduces burdens on operating system resources, and provides acceptable performance even where hundreds (or more) of target processes 206 are present on the computer system 100.

To provide such a method of communication, in selected embodiments, a single semaphore 300 is provided to enable communication between an attachment process 204 and a target process 206 on the computer system 100. The single semaphore 300 may be provided for all target processes 206 on the computer system 100 or some subset thereof. As will be described in more detail hereafter, this single semaphore 300 may be initialized to zero to cause the multiple target processes 206 to wait on the semaphore 300 until one of the attachment processes 204 attempts to connect to a target process 206. When an attachment process 204 attempts to connect to a specific target process 206, the attachment process 204 may lock a master lock file 302. When locked, the master lock file 302 will prevent other attachment processes 204 from attempting to connect to a target process 206. An attachment process 204 may lock the master lock file 302 to prevent races with other attachment processes 204 to connect to a target process 206. If an attachment process 204 finds that the master lock file 302 is already locked, it will be unable to connect to a target process 206 until the master lock file 302 is unlocked.

Once an attachment process 204 locks the master lock file 302, the attachment process 204 locks synchronization files 306 associated with each of the target processes 206. The purpose of the synchronization files 306 will be described in more detail hereinafter. The attachment process 204 may then write a message file 304 to identify the target process 206 with which it wants to establish a connection. At this point, the attachment process 204 may increment the semaphore 300 by the number of target processes 206. This will unblock each target process 206 and allow each target process 206 to decrement the semaphore 300 and read the message file 304. If a target process 206 determines that it is identified in the message file 304, the target process 206 establishes a connection with the attachment process 204 that wrote the message file 304. The attachment process 204 may then transfer data and/or instructions (e.g., diagnostic and/or maintenance tools) to the identified target process 206.

When the connection is established, the target process 206 that was identified in the message file 304 may attempt to lock its synchronization file 306. Since the synchronization file 306 is already locked by the attachment process 204, the target process 206 will be blocked. Meanwhile, the other target processes 206 (i.e., those not identified in the message file 304) may also attempt to lock their respective synchronization files 306. Since their synchronization files 306 are also locked by the attachment process 204, the other target processes 206 will also be blocked. In this way, all of the target processes 206 will be synchronized and execute a single time only. At this point, the attachment process 204 unlocks the master lock file 302 and synchronization files 306, and reduces the semaphore 300 to zero using, for example, a non-blocking wait. Because the synchronization files 306 are now unlocked, the target processes 206 may proceed to lock their respective synchronization files 306 and promptly unlock them (the synchronization files 306 are simply used as a synchronization and blocking mechanism). Since the value of the semaphore 300 is now zero, the target processes 206 will be blocked.

Figure 4:
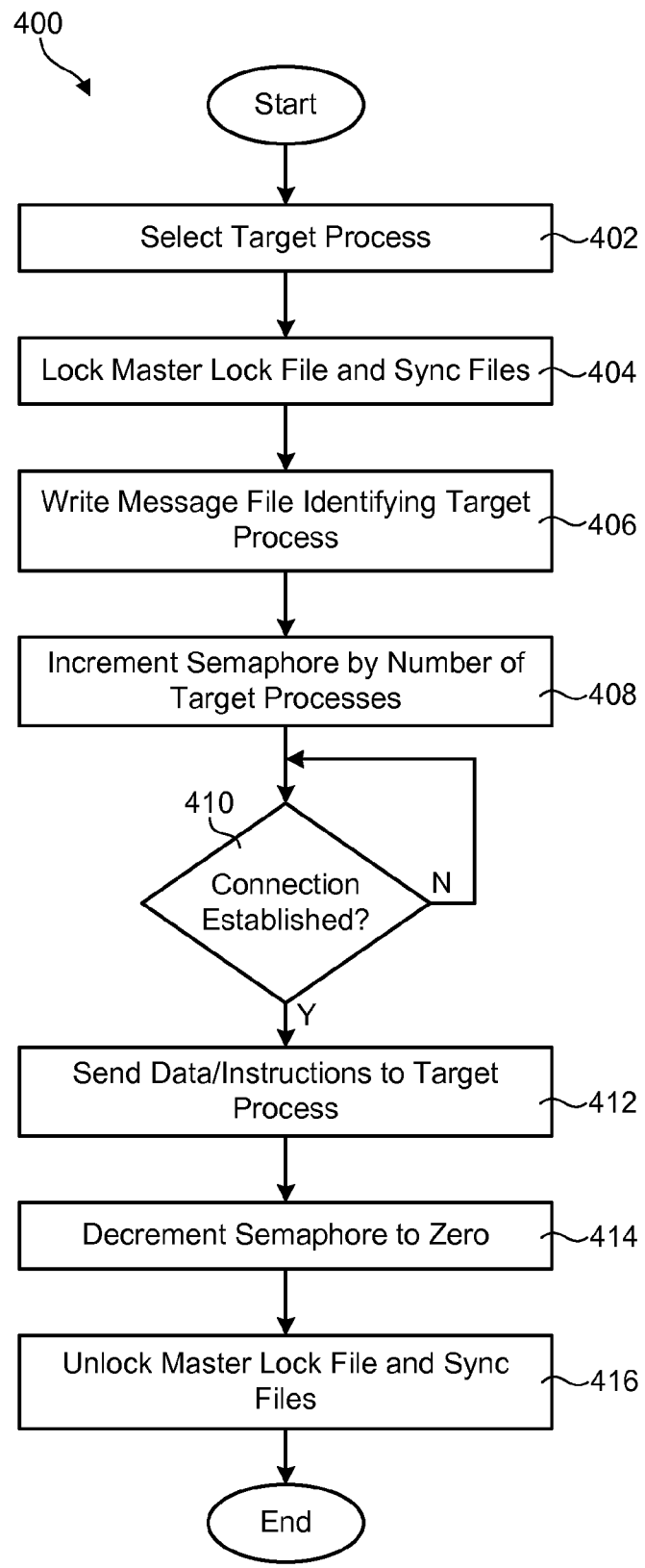
FIG. 4 is a flow diagram showing one embodiment of a method performed by an attachment process.

Referring to FIG. 4, one embodiment of a method 400 that may be performed by an attachment process 204 is illustrated. As shown, the attachment process 204 initially selects 402 a target process 206 with which to connect. The attachment process 204 then locks 404 the master lock file 302 and synchronization files 306 associated with each target process 206. The attachment process 204 then writes 406 a message file 304 identifying the target process 206 with which to connect. This message file 304 may be stored in a location that is accessible by each of the target processes 206 and may store information needed to connect to the attachment process 204, such as the port number of a socket designated for communication. The attachment process 204 then increments 408 the semaphore 300 by the number of target processes 206. This will unblock the target processes 206 and allow them to execute the method 500 illustrated in FIG. 5.

The attachment process 204 then waits 410 for the identified target process 206 to establish a connection with the attachment process 204. Once this connection is established, the attachment process 204 may send 412 data and/or instructions to the target process 206 over the connection. For example, the attachment process 204 may instruct the target process 206 to load one or more tool agents, such as one or more diagnostic and/or maintenance tools, to perform various functions. Other types of data and/or instructions may also be transmitted between the attachment process 204 and target process 206, as needed. When the connection is established, the attachment process 204 decrements 414 the semaphore 300 to zero using, for example, a non-blocking wait. This step 414 prevents target processes 206 that have not already woken up from waking up. This step 414 may be omitted if all target processes 206 have already woken up and decremented the semaphore 300 to zero. The attachment process 204 then unlocks 416 the master lock file 302 to allow other attachment processes 204 to place locks on the master lock file 302 and connect to target processes 206. The attachment process 204 also unlocks 416 the synchronization files 306, which unblocks the target processes 206 as will be explained in more detail hereafter. The method 400 then ends.

Figure 5:
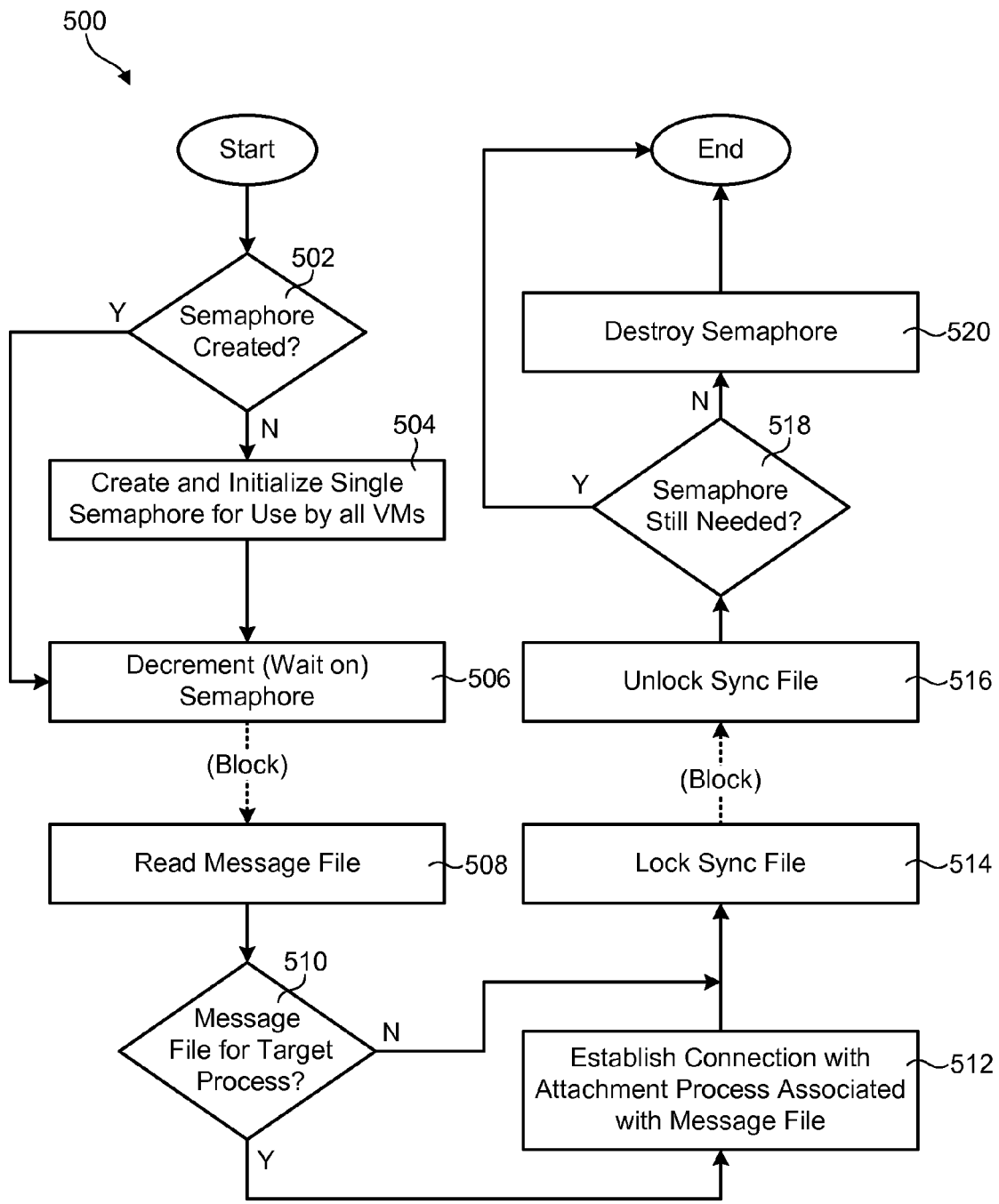
FIG. 5 is a flow diagram showing one embodiment of a method performed by a target process.

Referring to FIG. 5, one embodiment of a method 500 that may be performed by a target process 206 is illustrated. As shown, the target process 206 initially determines 502 whether a semaphore 300 has been created. If not, the target process 206 creates 504 and initializes 504 (sets to zero) a single semaphore 300 for use by all virtual machines 200 on the computer 100 or a subset thereof. The target process 206 then attempts to decrement 506 the semaphore 300 which causes the target process 206 to wait on 506 the semaphore 300 (since the value of the semaphore 300 is zero). When the attachment process 204 increments 408 the semaphore 300 (as described in FIG. 4), this will unblock the target process 206. At this point, the target process 206 will decrement 506 the semaphore 300 and read 508 the message file 304 to determine 510 if it is identified therein. If so, the target process 206 establishes 512 a connection with the attachment process 204 that wrote the message file 304. The target process 206 may accomplish this, for example, by reading a port number of a socket from the message file 304. The target process 206 may open the socket and write an acknowledgement thereto. The attachment process 204 may read the acknowledgement and thereby establish a connection with the target process 206. The attachment process 204 may then send data and/or instructions to the target process 206 over the connection.

Once the connection is established, the target process 206 may attempt to lock 514 its synchronization file 306. Because the attachment process 204 already has a lock on the synchronization file 306, the target process 206 will be blocked. Once the attachment process 204 unlocks the synchronization file 306, the target process 206 may proceed to lock 514 and unlock 516 the synchronization file 306. At this point, the execution of the target processes 206 should be synchronized, with each target process 206 executing a single time only. The target process 206 may then determine 518 whether the semaphore 300 is still needed (e.g., determine whether other active targets are still using the semaphore 300). If the semaphore 300 is not needed, the target process 206 may destroy 520 the semaphore 300 and end. Otherwise, the target process 206 will leave the semaphore 300 and end.

Figure 6:
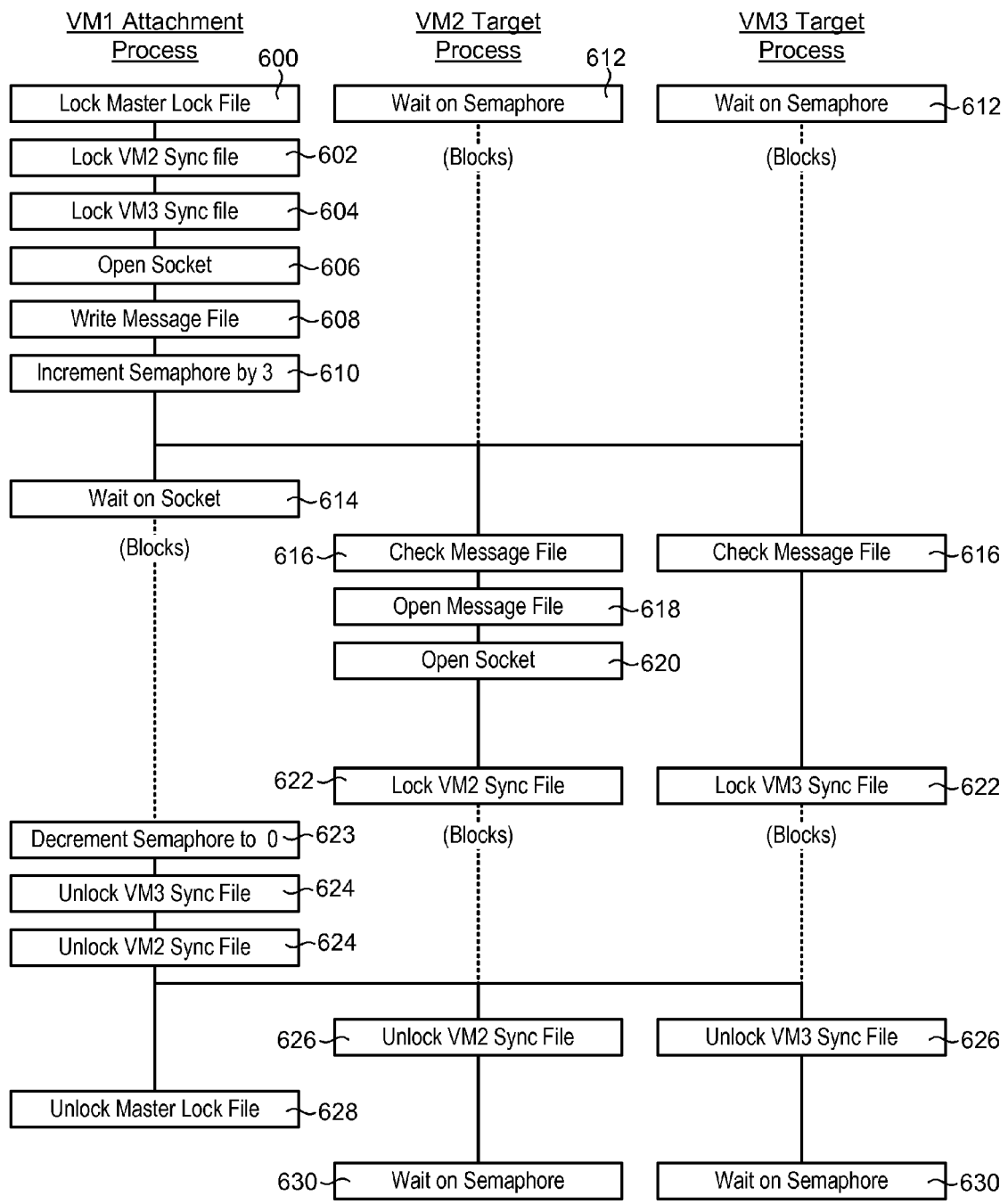
FIG. 6 is a flow diagram showing one example of communication between an attachment process and several target processes.

Referring to FIG. 6, a flow diagram showing one example of communication between an attachment process 204 and several target processes 206 is illustrated. More specifically, FIG. 6 shows communication between an attachment process 204 associated with a first virtual machine 200 (VM1), and target processes 206 associated with a second virtual machine 200 (VM2) and third virtual machine 200 (VM3). As shown, the attachment process 204 associated with VM1 initially locks 600, 602, 604 the master lock file 302 and the synchronization files 306 associated with the target processes 206 for VM2 and VM3. The attachment process 204 then opens 606 a socket to communicate with one of the target processes 206. The attachment process 204 then writes 608 a message file 304 identifying the target process 206 with which to communicate. In this example, the target process 206 identified in the message file 304 is that associated with VM2. The attachment process 204 writes to the message file 304 any information needed to connect to the attachment process 204, such as the port number of the socket used for communication. Meanwhile, the target processes 206 for VM2 and VM3 are waiting 612 on the semaphore 300, which has a value of zero.

The attachment process 204 then increments 610 the semaphore 300 by three, one for each virtual machine 200 (since VM1 will also have a waiting target process 206). This will wake up the waiting target processes 206. Meanwhile, the attachment process 204 waits 614 for a response on the open socket. The target processes 206 then check 616 the message file 304 to determine if they are identified therein. Since the target process 206 for VM2 is identified in the message file 304, the target process 206 for VM2 will open 618 the message file 304 to read the port number associated with the socket and/or read other information needed to establish a connection with the attachment process 204. The target process 206 then opens 620 a socket to establish a connection with the attachment process 204. The attachment process 204 associated with VM1 may then exchange data and/or instructions with the target process 206 of VM2 over the connection. When the connection is established, the target processes 206 may attempt to lock 622 their respective synchronization files 306 (although not necessarily at the same time). Since the attachment process 204 of VM1 holds the locks on these files 306, the target processes 206 will be blocked.

Once the attachment process 204 has established a connection with the target process 206 of VM2, the attachment process 204 decrements 623 the semaphore 300 to zero (if not already zero). The attachment process 204 then unlocks 624 the synchronization files 306 associated with the target processes 206. This unblocks the target processes 206 and allows them to lock 622 and unlock 626 their respective synchronization files 306. The attachment process 204 also unlocks 628 the master lock file 302, thereby allowing other attachment processes 204 to establish connections with the target processes 206. Because the semaphore 300 was decremented to zero at step 623, the target processes 206 again wait on the semaphore 300 at step 630.

Figure 7:
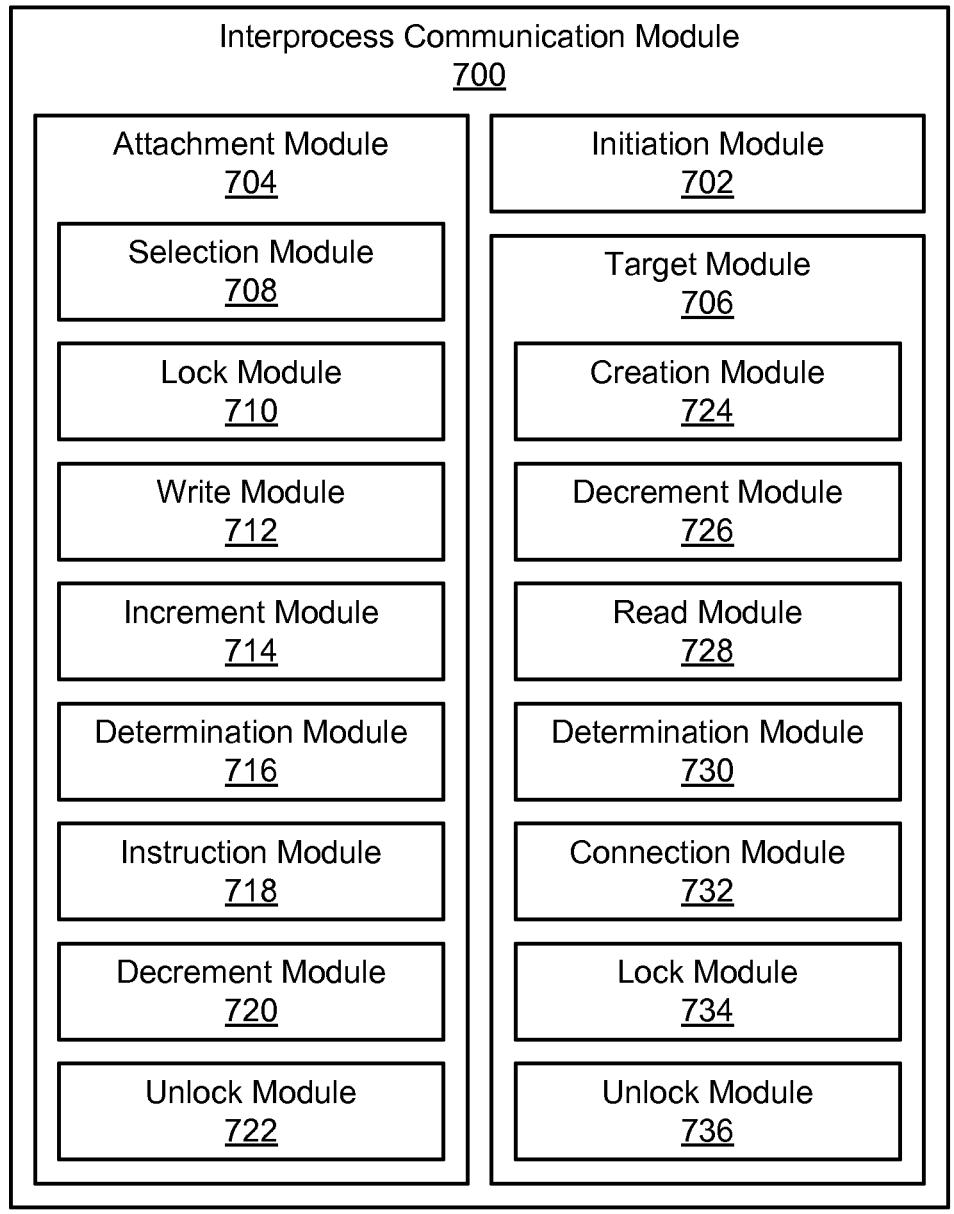
FIG. 7 is a high-level block diagram showing various modules that may be used to implement an apparatus and method in accordance with the invention.

Referring to FIG. 7, the methods illustrated in FIGS. 3 through 6 may be implemented by one or more modules. These modules are collectively referred to herein as an interprocess communication module 700. The modules may be implemented in hardware, software or firmware executable on hardware, or a combination thereof. The modules are presented only by way of example and are not intended to be limiting. Indeed, alternative embodiments may include more or fewer modules than those illustrated. Furthermore, it should be recognized that, in some embodiments, the functionality of some modules may be broken into multiple modules, or conversely, the functionality of several modules may be combined into a single module or fewer modules. The functionality may be implemented within a single or multiple threads of control within a virtual machine 200. It should also be recognized that the modules are not necessarily implemented in the locations where they are illustrated. For example, some functionality shown in the attachment module 704 may actually be implemented in the target module 706 and vice versa. Thus, the location of the modules is presented only by way of example and is not intended to be limiting.

As shown in FIG. 7, the interprocess communication module 700 includes an initiation module 702, an attachment module 704, and a target module 706. Each of these modules 702, 704, 706 contains one or more modules to perform various functions. An initiation module 702 may be configured to initiate a plurality of processes, including the attachment processes 204 and target processes 206 disclosed herein. The attachment module 704 may be associated with an attachment process 204 and the target module 706 may be associated with a target process 206.

As shown, the attachment module 704 includes a selection module 708, lock module 710, write module 712, increment module 714, determination module 716, instruction module 718, decrement module 720, and unlock module 722. The selection module 708 initially selects one of a plurality of target processes 206 with which to connect. A lock module 710 locks a master lock file 302 and synchronization files 306 associated with a plurality of target processes 206. A write module 712 writes a message file 304, identifying a target process 206 with which to connect, to a location accessible by each of the target processes 206. This message file 304 may store information needed to connect to the attachment process 204. An increment module 718 increments the semaphore 300 by the number of target processes 206 in order to unblock the target processes 206.

A determination module 716 determines whether a target process 206, identified in the message file 304, has connected to the attachment process 204. Once a connection has been established, an instruction module 718 sends data and/or instructions to the target process 206 by way of the connection. For example, the instruction module 718 may instruct a target process 206 to load one or more tool agents, such as diagnostic and/or maintenance tools. When the connection between the attachment process 204 and target process 206 has been established, a decrement module 720 decrements the semaphore 300 to zero. An unlock module 722 unlocks the master lock file 302 and the synchronization files 306 associated with the target processes 206.

As shown, the target module 706 includes a creation module 724, decrement module 726, read module 728, determination module 730, connection module 732, lock module 734, and unlock module 736. The creation module 724 is configured to create and initialize a single semaphore 300 for use by all the target processes 206 or a subset thereof. A decrement module 726 decrements (or attempts to decrement) the semaphore 300. If the value of the semaphore 300 is zero, the value cannot be decremented and the target process 206 will block. If the value of the semaphore 300 is non-zero, the decrement module 726 will decrement the semaphore 300 by one. A read module 728 reads the message file 304 and a determination module 730 determines if the associated target process 206 is identified in the message file 304. If so, a connection module 732 establishes a connection with the attachment process 204. If not, no such connection will be established.

A lock module 734 attempts to lock the synchronization file 306 of a target process 206. If the synchronization file 306 is already locked, the lock module 734 will be unable to lock the synchronization file 306 and the target process 206 will block. If the synchronization file 306 is not locked, the lock module 734 will lock the synchronization file 306. An unlock module 736 will then unlock the synchronization file 306.

Although the apparatus and methods disclosed herein have been discussed primarily in relation to the attachment processes 204 and target processes 206 associated with the Attach API 202, the apparatus and methods are not limited to such processes. Indeed, the communication techniques disclosed herein utilizing a single semaphore 300 may enable a wide variety of different processes to communicate with one another. Thus, the terms "attachment process" and "target process" are used broadly to encompass a wide variety of different processes that have a need to communicate with one another. The processes associated with the Attach API 202 are simply one example of certain processes that may benefit from the communication techniques disclosed herein.

The communication techniques using a single semaphore and file locks to facilitate communication between multiple processes 204, 206 may provide various advantages. For example, the communication technique may reduce the load on operating system resources and reduces the probability of "leaking" semaphores. The performance of the communication technique is reasonable even with hundreds of target processes 206. This is at least partly due to the fact that the target processes 206 do not consume CPU cycles except at virtual machine start time and while attaching. The communication technique also tends to be highly portable, since semaphores and file locks are available on most currently-used operating systems. The file-based security mechanisms used in various embodiments of the invention also protect access to the target processes 206.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Some blocks may be deleted or other blocks may be added depending on the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for enabling communication between a plurality of processes, the method comprising:
   initiating a plurality of processes, the plurality of processes comprising both attachment processes and target processes;
   creating and initializing a single semaphore for use by the plurality of processes, such that each of the target processes are initially blocked by the semaphore;
   writing, by an attachment process, a message file to a location readable by each of the target processes and identifying a specific target process with which the attachment process wants to establish a connection;
   incrementing, by the attachment process, the semaphore by the number of target processes, thereby unblocking each of the target processes and allowing each of the target processes to read the message file and thereby determine if it is the target process identified in the message file;
   establishing a connection between the attachment process and the specific target process identified in the message file; and
   decrementing the semaphore to zero, thereby blocking each of the target processes.

2. The method of claim 1, wherein, prior to incrementing the semaphore, the attachment process locks synchronization files associated with each of the target processes.

3. The method of claim 2, wherein, after decrementing the semaphore to zero, the attachment process unlocks the synchronization files associated with each of the target processes.

4. The method of claim 1, wherein, prior to incrementing the semaphore, the attachment process locks a master lock file to prevent races with other attachment processes.

5. The method of claim 4, wherein, after decrementing the semaphore to zero, the attachment process unlocks the master lock file.

6. The method of claim 1, wherein each of the plurality of processes is associated with a Java Virtual Machine.

7. The method of claim 1, wherein establishing a connection further comprises establishing an API connection.

8. The method of claim 1, wherein establishing a connection further comprises instructing the specific target process to load one or more tool agents.

\* \* \* \* \*